US012600625B2

(12) United States Patent
Zanichelli et al.

(10) Patent No.: US 12,600,625 B2
(45) Date of Patent: Apr. 14, 2026

(54) METHOD FOR THE SUPPRESSION OF SOOT FORMATION IN AN ATR OR POX REACTOR

(71) Applicant: Casale SA, Lugano (CH)

(72) Inventors: Luca Zanichelli, Milan (IT); Giacomo Colmegna, Massagno (CH)

(73) Assignee: Casale SA, Lugano (CH)

( * ) Notice: Subject to any disclaimer, the term of this patent is extended or adjusted under 35 U.S.C. 154(b) by 750 days.

(21) Appl. No.: 17/436,568

(22) PCT Filed: Feb. 18, 2020

(86) PCT No.: PCT/EP2020/054176
§ 371 (c)(1),
(2) Date: Sep. 3, 2021

(87) PCT Pub. No.: WO2020/178018
PCT Pub. Date: Sep. 10, 2020

(65) Prior Publication Data
US 2022/0119253 A1 Apr. 21, 2022

(30) Foreign Application Priority Data
Mar. 5, 2019 (EP) ..................................... 19160723

(51) Int. Cl.
*C01B 3/36* (2006.01)
*C01B 3/38* (2006.01)

(52) U.S. Cl.
CPC .................. *C01B 3/36* (2013.01); *C01B 3/38* (2013.01); *C01B 2203/0244* (2013.01); *C01B*

*2203/0255* (2013.01); *C01B 2203/1235* (2013.01); *C01B 2203/169* (2013.01)

(58) Field of Classification Search
CPC ........................................................ C01B 3/32
See application file for complete search history.

(56) References Cited

U.S. PATENT DOCUMENTS 7,510,793 B2 3/2009 Perna et al.

FOREIGN PATENT DOCUMENTS

| | | |
|---|---|---|
| DE | 102009015767 | 10/2010 |
| EP | 0982266 | 3/2000 |
| EP | 1413547 A1 | 4/2004 |
| EP | 1012113 | 3/2005 |
| RU | 2667293 C2 | 9/2018 |

(Continued)

OTHER PUBLICATIONS

Christensen et al. ("Improve syngas production using autothermal reforming" Hydrocarbon Processing, Mar. 1994, pp. 39-46). (Year: 1994).*

(Continued)

*Primary Examiner* — Peter F Godenschwager
(74) *Attorney, Agent, or Firm* — Blank Rome

(57) ABSTRACT
A method for the suppression of soot formation during the partial oxidation of a hydrocarbon-containing gaseous feed, in the presence of steam and in an ATR reactor or in a POX reactor, the method comprising the addition of gaseous carbon dioxide to the hydrocarbon-containing gaseous feed before entry into the reactor. A method for determining a minimum steam to carbon ratio required for scot-free operation is also disclosed.

11 Claims, 2 Drawing Sheets

(56) References Cited

FOREIGN PATENT DOCUMENTS

| WO | 2016198245 | 12/2016 |
| WO | 2019/020513 A1 | 1/2019 |

OTHER PUBLICATIONS

Nourbakhsh et al., "A Thermodynamic Analysis of Biogas Partial Oxidation to Synthesis Gas with Emphasis on Soot Formation," International Journal of Hydrogen Energy XXX, 2018, pp. 1-17.

Svensson et al., "Modeling of Soot Formation During Partial Oxidation of Producer Gas," Fuel, 2013, pp. 271-278.

Rice et al., "Autothermal Reforming of Natural Gas to Synthesis Gas," Sandia Report, Apr. 2007.

International Search Report issued in connection with PCT/EP2020/054176.

Written Opinion of the International Searching Authority issued in connection with PCT/EP2020/054176.

International Preliminary Report on Patentability issued in connection with PCT/EP2020/054176.

Ramos et al., "Feasibility Study for Mega Plant Construction of Synthesis Gas to Produce Ammonia and Methanol," Fuel, vol. 110, 2013, pp. 141-152.

* cited by examiner

METHOD FOR THE SUPPRESSION OF SOOT FORMATION IN AN ATR OR POX REACTOR

CROSS-REFERENCE TO RELATED APPLICATIONS

This application is a national phase of PCT/EP2020/054176, filed Feb. 18, 2020, and claims priority to EP 19160723.3, filed Mar. 5, 2019, the entire contents of both of which are hereby incorporated by reference.

FIELD OF THE INVENTION

The invention relates to ATR reactors and POX reactors. The invention relates particularly to a method for the suppression of soot formation in an ATR reactor or in a POX reactor.

PRIOR ART

Autothermal reforming (ATR) and partial oxidation (POX) reactors are widely used in the field of production of synthesis gas.

An ATR reactor can be used as a self-standing syngas generation unit or can be used for secondary reforming after a primary steam reforming in a fired furnace. An ATR reactor fed by air or enriched air is often known as secondary reformer. On the contrary POX systems are an alternative technology typically used to convert a preheated hydrocarbon gas and oxidant.

Autothermal reforming is performed in the presence of a catalyst while partial oxidation is performed in absence of catalyst. The temperature may be around 1000 to 1300° C. for ATR (at the catalyst bed inlet) and even higher (1300° C. or more) for POX. The pressure is typically in the range 10 to 100 bar.

The ATR and POX reactors include a burner, which is normally installed on top of the reactor vessel, above a reaction chamber. The reaction chamber contains a catalyst in the case of ATR.

The burner provides mixing between a gaseous fuel and a gaseous oxidant. The fuel may be a pre-heated hydrocarbon or a partially reformed hydrocarbon with a certain amount of steam, which may be already contained in the fuel or added to the fuel. The oxidant is normally air, oxygen-enriched air, or substantially pure oxygen, possibly added with steam. The hydrocarbon may be natural gas for example. In a known configuration, the burner includes an oxidant pipe with a circular cross section, coaxially arranged with an annular fuel pipe.

A field of particular interest for application of ATR or POX systems is the conversion of a hydrocarbon source into a partially oxidized CO-containing synthesis gas, for example a mixture of H2 and CO. Both ATR and POX can be used to produce such gas.

A CO-containing gas still has a considerable heat value and can be used as a fuel; a H2 and CO gas has also a variety of applications in the chemical industry, e.g. it is a feed for synthesis of several products including, among others, ammonia and methanol.

The production of a CO-containing gas from a hydrocarbon source however requires under-stoichiometric combustion which may lead to undesirable formation of soot. The formation of soot has several drawbacks: loss of carbon source, which is not converted into CO as desired; fouling and obstruction of conduits; need of periodical cleaning which is expensive and disposal of a pollutant and potentially carcinogenic substance.

The formation of soot is a complex process influenced by several parameters.

It is known, for example, that the steam to carbon ratio and the oxygen to carbon ratio influence the formation of soot: the greater these two ratios, the lesser the formation of soot. However increasing the steam to carbon ratio and/or the oxygen to carbon ratio to inhibit soot formation has the disadvantage of increasing the consumption of steam or oxygen, which are valuable source materials.

It is also known that soot formation is reduced by intensive mixing between the fuel and oxidant. Accordingly, a number of prior art solutions try to reduce soot by giving a high velocity and/or swirling to one or both of the fuel and oxidant streams. Other solutions deviate from the common coaxial configuration of the streams in an attempt to improve mixing, for example by directing a stream of fuel perpendicular to a stream of oxidant. These techniques and more generally all techniques based on high velocities, swirler and change of directions of the flows have the drawbacks of introducing a significant pressure loss.

WO 2016/198245 for example discloses a method for determining temperature, pressure and steam to carbon ratio for soot free operation in an ATR.

In summary, the need to reduce the soot formation forces the adoption of certain operating parameters, such as a large excess of steam/oxygen, or a high velocity and swirl of the streams, which inevitably entail some drawbacks.

Therefore, there is still the need to provide an improved design of an ATR or POX burner which is able to reduce the soot formation and operate under more advantageous conditions, thus minimizing the above drawbacks.

SUMMARY OF THE INVENTION

The invention aims to solve the above problem and provide an improved reactor with less soot formation, compared to the prior art reactors, for a given set of operation parameters such as reaction pressure and temperature, steam and oxygen consumption, pressure drop of the feed streams of fuel and oxidant.

The invention is based on the finding that carbon dioxide added to the gaseous feed of the partial oxidation process acts as a soot suppressor.

The aim of the invention is reached with a method for the suppression of soot formation during the partial oxidation of a hydrocarbon-containing gaseous feed, in the presence of steam and in an ATR reactor or in a POX reactor, the method comprising the addition of gaseous carbon dioxide to the hydrocarbon-containing gaseous feed before entry into the reactor.

Preferred features of the invention are stated in the dependent claims.

Particularly, carbon dioxide is preferably added in an amount such that a ratio $m_{CO2}/m_C$ is at least 0.25, wherein: $m_{CO2}$ denotes the moles of added carbon dioxide and $m_C$ denoted the moles of carbon contained in the feed prior to addition of CO2. Preferably said ratio is 0.25 to 2 and more preferably 0.25 to 1.

Carbon dioxide may be added to the hydrocarbon-containing gaseous feed before or after addition of steam.

The hydrocarbon-containing feed is preferably a natural gas or a methane-containing feed.

Another aspect of the invention is a method for determining a minimum steam to carbon ratio for soot free operation in a process of partial oxidation of a hydrocarbon-containing gaseous feed according to the claims.

Said minimum steam to carbon ratio is also termed critical steam to carbon ratio. This ratio is generally regarded as the ratio at which soot formation starts, for a given set of process conditions. Said process conditions may include, among others, the pressure, temperature, composition of the feed, oxygen to carbon ratio.

Particularly, for a steam to carbon ratio greater than the critical value the process is virtually soot-free, whilst below the critical value the formation of soot becomes detectable and rapidly increases if the ratio is further lowered.

The term of soot free oxidation process denotes a process wherein the formation of soot is deemed negligible. Typically, this is the case when the soot in the effluent of the oxidation process is not greater than 5 ppb (parts per billion) in volume or even less (e.g. 2 ppb or less).

According to an aspect of the invention, the minimum steam to carbon ratio (critical ratio), in the presence of added $CO_2$ to the stream, is calculated by a correction of the minimum ratio in absence of $CO_2$ addition, the other process conditions being the same. Then, the minimum steam to carbon ratio with added $CO_2$ is calculated as:

$$(S/C)_{lim,CO2}=(S/C)_{lim}-\zeta \cdot (m_{CO2}/m_C) \qquad (1)$$

wherein:

$(S/C)_{lim,CO2}$ is the critical steam to carbon ratio of the process when the process is performed with a first gaseous feed which is a reference feed of hydrocarbon and steam with added $CO_2$;

$(S/C)_{lim}$ is the critical steam to carbon ratio of the given process when the process is performed with a second feed which is said reference feed without added $CO_2$;

$m_{CO2}$ denotes the moles of $CO_2$ added to the first gaseous feed;

$m_C$ denoted the moles of carbon contained in the first gaseous feed before addition of $CO_2$;

$\zeta$ is in the range 0.4 to 0.6.

The equation (1) was found experimentally by the applicant. The equation shows that, for a given set of conditions, the addition of $CO_2$ into the feed stream decreases the soot critical steam to carbon ratio. Consequently, for example, for a given set of process conditions the addition of $CO_2$ as soot suppressor allows reducing the amount of steam to operate at a lower steam to carbon ratio without incurring in soot formation. A reduced amount of steam has advantages because steam is expensive in terms of energy and increases the volume flow rate and therefore the size of equipment.

The above method of calculation of the minimum steam to carbon ratio can be applicable to the control of the partial oxidation process. Therefore, still another aspect of the invention is a method of controlling a process of partial oxidation, wherein the steam to carbon ratio is maintained above a minimum value which is calculated according to the formula (1) above.

The benefit of the invention is elucidated by FIG. 1 and FIG. 2, wherein.

Figure 1:
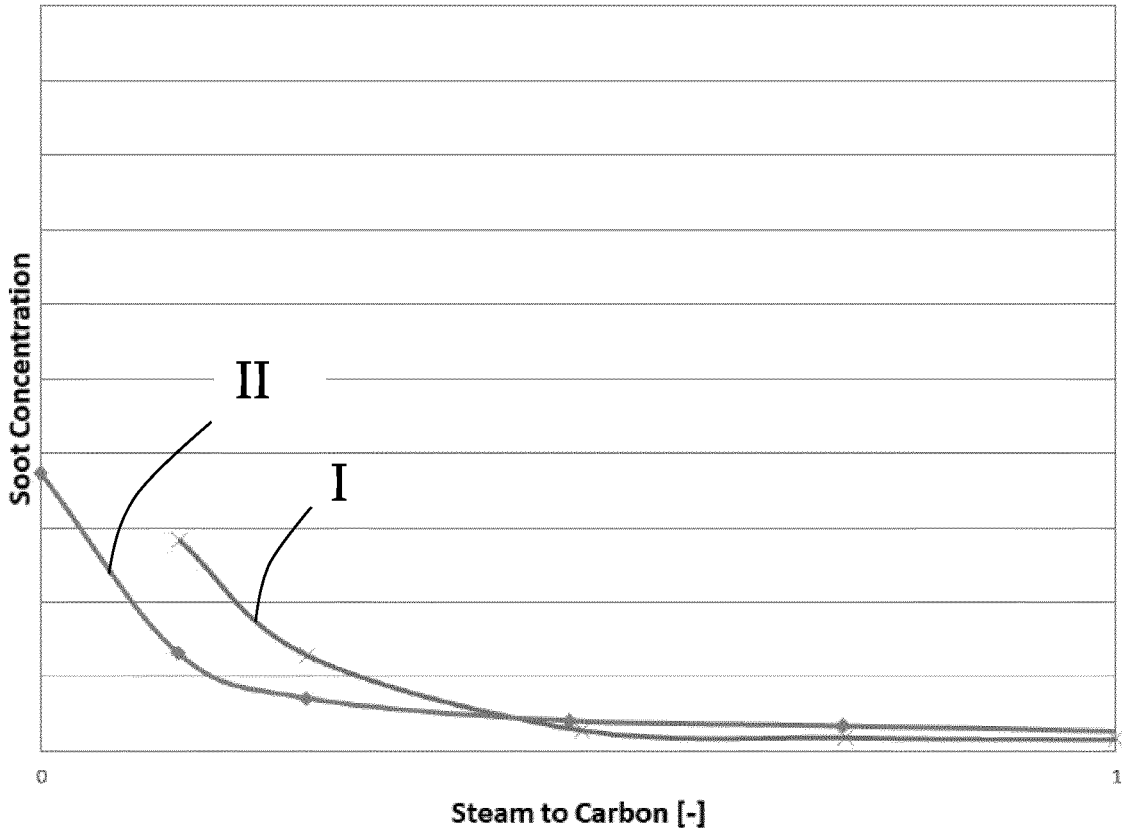
FIG. 1 is a plot of soot concentration Vs. steam to carbon ratio for a process of partial oxidation performed at 15 bar pressure, using methane ($CH_4$) as fuel and in the presence of oxygen to carbon ($O_2/C$) ratio of 0.5.

In FIG. 1, the plot I relates to a base case without addition of $CO_2$ to the feed and the plot II relates to the same process as in the base case, with addition of $CO_2$ to the feed gas in an amount such that $m_{CO2}/m_C$ is 0.25.

Figure 2:
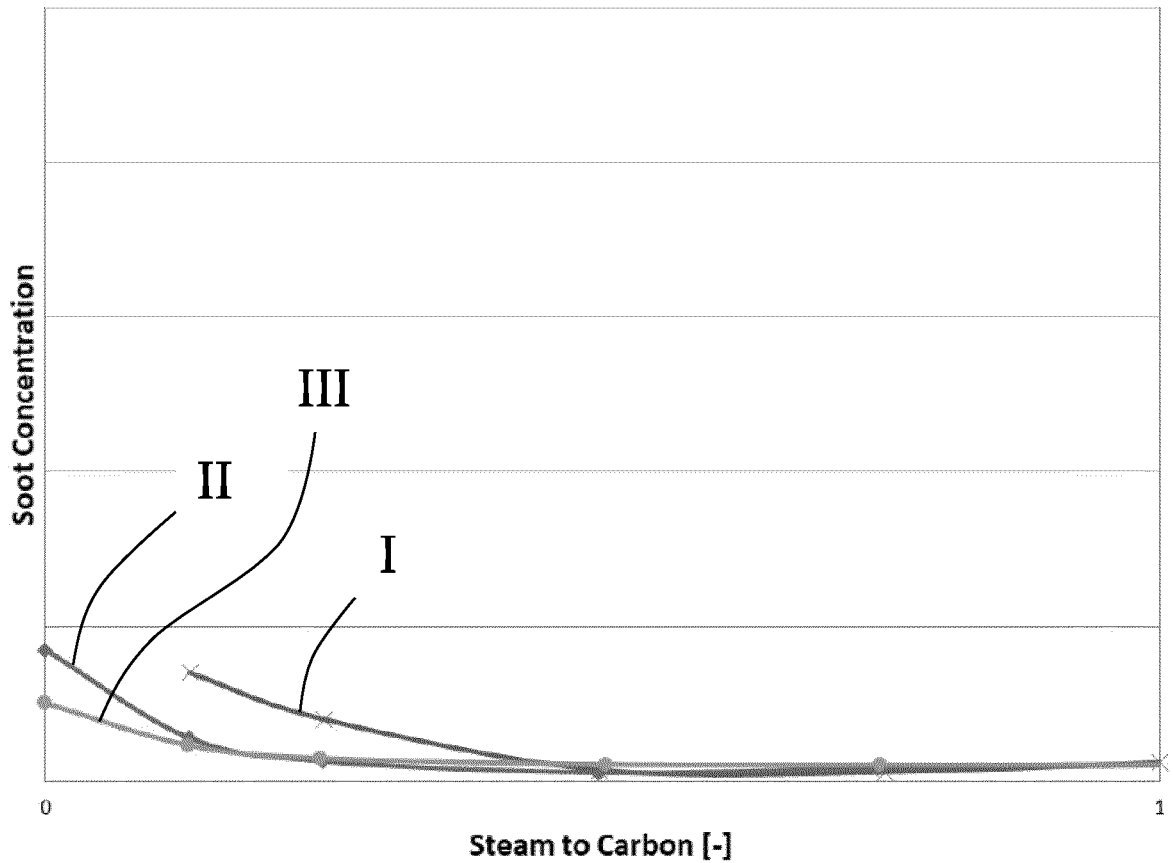
FIG. 2 is a plot of soot concentration Vs. steam to carbon ratio for a process of partial oxidation as in FIG. 1 with oxygen to carbon ($O_2/C$) ratio of 0.6.

In FIG. 2, the plot I relates to a base case without addition of $CO_2$ to the feed; the plot II relates to addition of $CO_2$ such that $m_{CO2}/m_C$=0.25 and plot III relates to $m_{CO2}/m_C$=0.66.

All plots of FIG. 1 and FIG. 2 illustrate that the comparative base case starts to form soot at higher S/C values. In other words, the addition of $CO_2$ reduces the soot critical S/C, which means the process can be operated at a lower S/C to save steam without incurring in the soot formation. FIG. 2 illustrates that adding more carbon dioxide further reduces the critical S/C, as can be seen from a comparison of plots II and III.

What is claimed is:

1. A method, comprising:

suppressing soot formation during the partial oxidation of a hydrocarbon-containing gaseous feed, in the presence of steam and in an ATR reactor or in a POX reactor, wherein the suppression of the soot formation comprises adding gaseous carbon dioxide as a soot suppressor to the hydrocarbon-containing gaseous feed before entry into the reactor.

2. The method according to claim 1, wherein the ratio $m_{CO2}/m_C$ of moles of added carbon dioxide over moles of carbon contained in the feed prior to addition of $CO_2$ is at least 0.25.

3. The method according to claim 2, wherein said ratio $m_{CO2}/m_C$ is in the range 0.25 to 2.

4. The method according to claim 2, wherein said ratio $m_{CO2}/m_C$ is in the range 0.25 to 1.

5. The method according to claim 1, wherein $CO_2$ is added to the hydrocarbon-containing gaseous feed before or after addition of steam.

6. The method according to claim 1, further comprising the step of controlling the amount of said steam in order to satisfy the following relationship:

$$(S/C)_{lim,CO2}=(S/C)_{lim}-\zeta \cdot (m_{CO2}/m_C)$$

wherein:

$(S/C)_{lim}$ is the minimum steam to carbon ratio for soot-free operation of the process when performed with the gaseous feed without addition of $CO_2$;

$(S/C)_{lim, CO2}$ is the minimum steam to carbon ratio for soot-free operation of the process when performed with addition of $CO_2$ to the gaseous feed;

$(m_{CO2}/m_C)$ denotes the ratio of moles of $CO_2$ added to the feed over the moles of carbon contained in the feed before addition of $CO_2$;

$\zeta$ is in the range 0.4 to 0.6.

7. The method according to claim 6 wherein the concentration in volume of the soot in the effluent of the partial oxidation process is not greater than 5 ppb.

8. The method according to claim 1, wherein said gaseous carbon dioxide is added to the hydrocarbon-containing gaseous feed before an addition of steam.

9. The method according to claim 1, wherein said gaseous carbon dioxide is added to the hydrocarbon-containing gaseous feed after an addition of steam.

10. A method for controlling a partial oxidation process in an ATR or POX reactor, the process being carried out in the presence of steam and with addition of carbon dioxide to a hydrocarbon-containing gaseous feed of the process before entry into the reactor, the method including the determination of a minimum steam to carbon ratio for soot-free operation in the presence of added $CO_2$, according to:

$$(S/C)_{lim,CO2}=(S/C)_{lim}-\zeta \cdot (m_{CO2}/m_C)$$

wherein:

$(S/C)_{lim}$ is the minimum steam to carbon ratio for soot-free operation of the process when performed with the gaseous feed without addition of CO2;

$(S/C)_{lim, CO2}$ is the minimum steam to carbon ratio for soot-free operation of the process when performed with addition of CO2 to the gaseous feed;

$(m_{CO2}/m_C)$ denotes the ratio of moles of CO2 added to the feed over the moles of carbon contained in the feed before addition of CO2;

$\zeta$ is in the range 0.4 to 0.6.

11. The method according to claim 10 wherein the concentration in volume of the soot in the effluent of the partial oxidation process is not greater than 5 ppb.

\* \* \* \* \*